United States Patent
Ch'ng et al.

(10) Patent No.: US 8,594,663 B2
(45) Date of Patent: Nov. 26, 2013

(54) SELECTING EMBEDDED CELLS IN WIRELESS NETWORKS

(75) Inventors: Shi Baw Ch'ng, North Billerica, MA (US); Douglas Norman Knisely, Wheaton, IL (US); Pierre A. Humblet, Cambridge, MA (US); Amit Mate, Chelmsford, MA (US)

(73) Assignee: Airvana LLC, Chelmsford, MA (US)

( * ) Notice: Subject to any disclaimer, the term of this patent is extended or adjusted under 35 U.S.C. 154(b) by 1126 days.

(21) Appl. No.: 11/903,742

(22) Filed: Sep. 24, 2007

(65) Prior Publication Data

US 2009/0082020 A1  Mar. 26, 2009

(51) Int. Cl.
*H04W 4/00* (2009.01)
*H04L 12/26* (2009.01)

(52) U.S. Cl.
USPC ........................................ 455/432.3; 370/244

(58) Field of Classification Search
USPC ............ 455/432.3, 410, 434, 435.3; 370/338, 370/244; 709/231, 213, 223
See application file for complete search history.

(56) References Cited

U.S. PATENT DOCUMENTS

| | | | |
|---|---|---|---|
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 6,799,038 B2* | 9/2004 | Gopikanth | 455/435.2 |
| 7,164,912 B2* | 1/2007 | Buckley et al. | 455/435.2 |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 7,558,356 B2 | 7/2009 | Pollman et al. | |
| 7,558,588 B2 | 7/2009 | To et al. | |
| 7,647,047 B2* | 1/2010 | Moghaddam et al. | 455/434 |
| 2002/0196749 A1 | 12/2002 | Eyuboglu et al. | |
| 2003/0100311 A1 | 5/2003 | Chung et al. | |
| 2003/0203735 A1* | 10/2003 | Andrus et al. | 455/450 |
| 2004/0192306 A1* | 9/2004 | Elkarat et al. | 455/435.2 |
| 2005/0090255 A1* | 4/2005 | Kuchibhotla et al. | 455/435.2 |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2006/0067422 A1 | 3/2006 | Chung | |
| 2006/0067451 A1 | 3/2006 | Pollman et al. | |
| 2006/0126509 A1 | 6/2006 | Abi-Nassif et al. | |
| 2006/0159045 A1 | 7/2006 | Ananthaiyer et al. | |

(Continued)

FOREIGN PATENT DOCUMENTS

GB  2452688  3/2009

OTHER PUBLICATIONS

3rd Generation Partnership Project 2 "3GPP2", "cdma2000 High Rate Packet Data Interface Specification", C.S0024, version 2, Oct. 27, 2000 (441 pages).

(Continued)

*Primary Examiner* — Kiet Doan
(74) *Attorney, Agent, or Firm* — Fish & Richardson P.C.

(57) ABSTRACT

An access terminal determines whether a parameter encoded in a signal received from an embedded access point is identified by a list in a memory of the access terminal. Based on the determination, the access terminal initiates communication with a radio area network through the embedded access point.

58 Claims, 5 Drawing Sheets

(56) References Cited

U.S. PATENT DOCUMENTS

| | | | |
|---|---|---|---|
| 2006/0176853 A1* | 8/2006 | Liu et al. .................. | 370/331 |
| 2006/0240782 A1 | 10/2006 | Pollman et al. | |
| 2006/0291420 A1 | 12/2006 | Ng | |
| 2006/0294241 A1 | 12/2006 | Cherian et al. | |
| 2007/0026884 A1 | 2/2007 | Rao | |
| 2007/0058628 A1 | 3/2007 | Rao et al. | |
| 2007/0077948 A1 | 4/2007 | Sharma et al. | |
| 2007/0097916 A1 | 5/2007 | Eyuboglu et al. | |
| 2007/0115896 A1 | 5/2007 | To et al. | |
| 2007/0140172 A1 | 6/2007 | Garg et al. | |
| 2007/0140184 A1 | 6/2007 | Garg et al. | |
| 2007/0140185 A1 | 6/2007 | Garg et al. | |
| 2007/0140218 A1 | 6/2007 | Nair et al. | |
| 2007/0155329 A1 | 7/2007 | Mehrabanzad et al. | |
| 2007/0220573 A1 | 9/2007 | Chiussi et al. | |
| 2007/0230419 A1 | 10/2007 | Raman et al. | |
| 2007/0238442 A1 | 10/2007 | Mate et al. | |
| 2007/0238476 A1 | 10/2007 | Raman et al. | |
| 2007/0242648 A1 | 10/2007 | Garg et al. | |
| 2007/0248042 A1 | 10/2007 | Harikumar et al. | |
| 2008/0003988 A1 | 1/2008 | Richardson | |
| 2008/0013488 A1 | 1/2008 | Garg et al. | |
| 2008/0049702 A1* | 2/2008 | Meylan et al. ............. | 370/342 |
| 2008/0062925 A1 | 3/2008 | Mate et al. | |
| 2008/0065752 A1 | 3/2008 | Ch'ng et al. | |
| 2008/0069020 A1 | 3/2008 | Richardson | |
| 2008/0069028 A1 | 3/2008 | Richardson | |
| 2008/0076398 A1 | 3/2008 | Mate et al. | |
| 2008/0117842 A1 | 5/2008 | Rao | |
| 2008/0119172 A1 | 5/2008 | Rao et al. | |
| 2008/0120417 A1 | 5/2008 | Harikumar et al. | |
| 2008/0139203 A1 | 6/2008 | Ng et al. | |
| 2008/0146232 A1 | 6/2008 | Knisely | |
| 2008/0151843 A1 | 6/2008 | Valmikam et al. | |
| 2008/0159236 A1 | 7/2008 | Ch'ng et al. | |
| 2008/0159245 A1* | 7/2008 | Benn et al. ................. | 370/338 |
| 2008/0162924 A1 | 7/2008 | Chinitz et al. | |
| 2008/0162926 A1 | 7/2008 | Xiong et al. | |
| 2008/0253550 A1 | 10/2008 | Ch'ng et al. | |
| 2008/0254792 A1 | 10/2008 | Ch'ng | |
| 2009/0034440 A1 | 2/2009 | Samar et al. | |
| 2009/0047960 A1* | 2/2009 | Gunnarsson et al. ........ | 455/436 |
| 2009/0082020 A1 | 3/2009 | Ch'ng et al. | |
| 2009/0088155 A1 | 4/2009 | Kim | |
| 2009/0116445 A1 | 5/2009 | Samar et al. | |
| 2009/0154447 A1 | 6/2009 | Humblet | |
| 2009/0156165 A1 | 6/2009 | Raghothaman et al. | |
| 2009/0156195 A1 | 6/2009 | Humblet | |
| 2009/0156218 A1 | 6/2009 | Garg et al. | |

OTHER PUBLICATIONS

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

3rd Generation Partnership Project, Technical Specification Group Core Network and Terminals; Numbering, addressing and identification (Release 7), 3GPP TS 23.003 v7.4.0, Global System for Mobile Communications, Jun. 2007 (53 pages).

3rd Generation Partnership Project, Technical Specification Group Radio Access Network; User Equipment (UE) procedures in idle mode and procedures for cell reselection in connected mode (Release 7), 3GPP TS 25.304 v7.6.0, Universal Mobile Telecommunications Systems (UMTS), Jun. 2007 (43 pages) (revised version of 25.304 v7.2.0).

3rd Generation Partnership Project, Technical Specification Group Radio Access Network; Radio Resource Control (RRC); Protocol Specification (Release 7), 3GPP TS 25.331 v7.9.0, Universal Mobile Telecommunications Systems (UMTS), Jul. 2008 (1473 pages) (revised version of 25.331 v7.5.0).

U.S. Appl. No. 60/955,510, filed Aug. 13, 2007.

U.S. Appl. No. 60/960,855, filed Oct. 17, 2007.

* cited by examiner

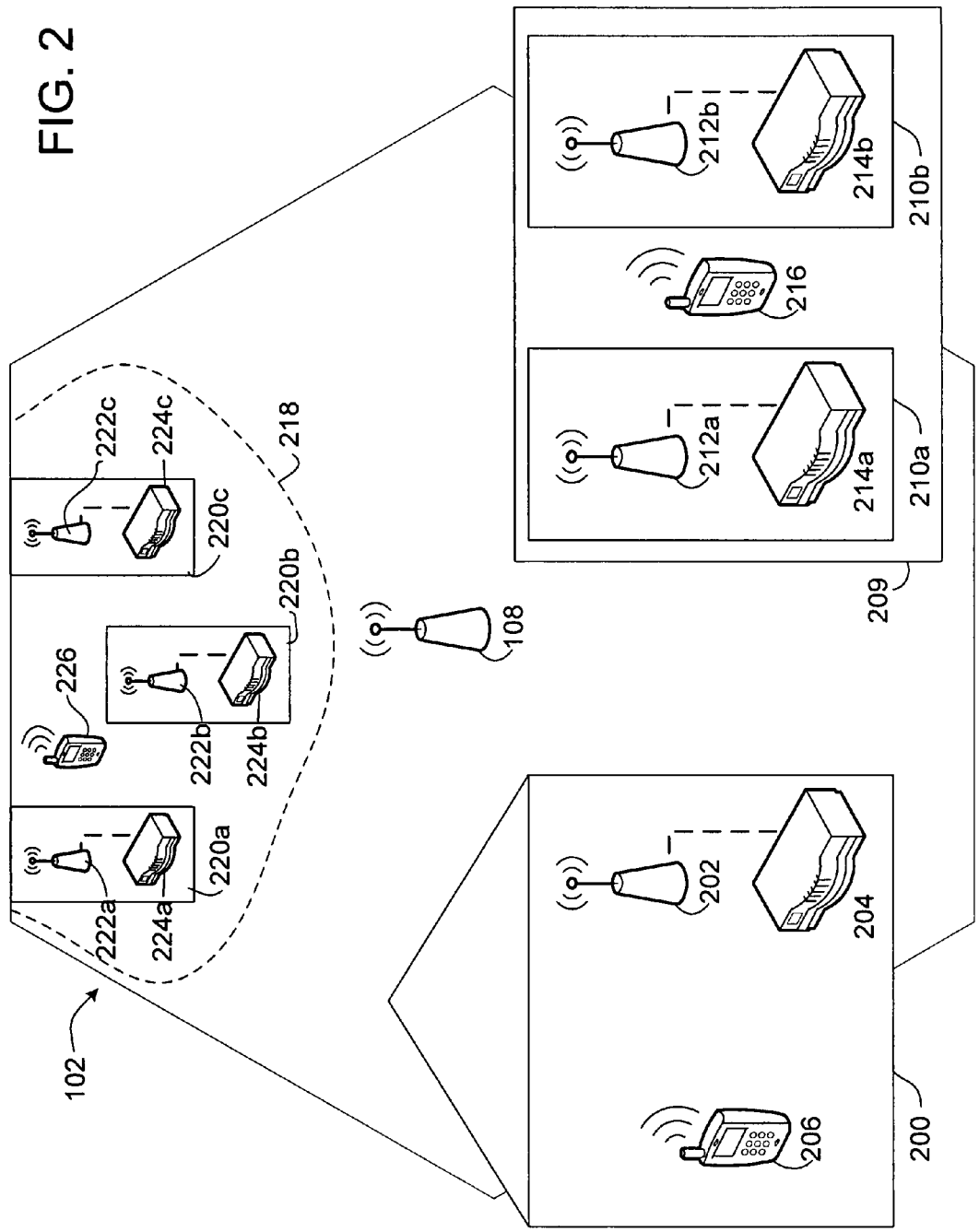

SELECTING EMBEDDED CELLS IN WIRELESS NETWORKS

BACKGROUND

This disclosure relates to selecting embedded cells in wireless networks.

Cellular wireless communications systems are designed to serve many access terminals distributed in a large geographic area by dividing the area into cells, as shown in FIG. 1. At or near the center of each cell 102, 104, 106, a radio network access point 108, 110, 112, also referred to as a base transceiver station (BTS), is located to serve access terminals 114, 116 (e.g., cellular telephones, laptops, PDAs, also known as mobile stations) located in the cell. Each cell is often further divided into sectors 102a-c, 104a-c, 106a-c by using multiple sectorized antennas. In each cell, that cell's radio network access point may serve one or more sectors and may communicate with multiple access terminals in its cell. In the example of FIG. 1, the access points are connected over a backhaul connection 118 to radio network control/packet data serving nodes (RNC/PDSN) 120, which may be one or more physical devices at different locations.

The 1xRTT protocol has been standardized by the Telecommunication Industry Association (TIA) in the TIA-2000.1 through TIA-2000.6 series of specifications, which are incorporated herein by reference.

The 1xEV-DO protocol has been standardized by the Telecommunication Industry Association (TIA) as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference. Other wireless communication protocols may also be used.

The UMTS and HSDPA protocols (W-CDMA) have been standardized by the Third Generation Partnership Project (3GPP). Specifications relevant to this disclosure include 3GPP TS 23.003 v7.4.0, 3rd Generation Partnership Project; Technical Specification Group Core Network and Terminals; Numbering, addressing and identification (Release 7); 3GPP TS 25.304 v7.2.0, 3rd Generation Partnership Project; Technical Specification Group Radio Access Network; User Equipment (UE) procedures in idle mode and procedures for cell reselection in connected mode (Release 7); and 3GPP TS 25.331 v7.5.0, 3rd Generation Partnership Project; Technical Specification Group Radio Access Network; Radio Resource Control (RRC); Protocol Specification (Release 7).

When connecting to a radio network, an access terminal selects an access point from a list of available radio network access points that are known to be within communication range. In conventional CDMA systems, the access terminal obtains the list of available access points from "neighbor list information." In general, neighbor list information includes the set of radio channels (e.g., radio access technology, band classes, frequencies, and channel bandwidths) and other necessary information (such as timing offsets, coding information, details about the particular radio technology in that channel, search window size, etc.) to assist the access terminal in locating radio network access points from which it can potentially receive radio services.

Neighbor list information is typically provided to the access terminal via (1) a preconfigured database programmed into the access terminal in a static or semi-static (infrequently updated) state or (2) overhead signaling messages that are transmitted by some or all of the radio network access points located within the general vicinity of the access terminal. These mechanisms for providing neighbor list information to an access terminal are generally implemented on static radio access networks in which the locations of radio network access points are either permanently fixed or changed infrequently.

SUMMARY

In general, in one aspect, an access terminal determines whether a parameter encoded in a signal received from an embedded access point is identified by a list in a memory of the access terminal. Based on the determination, the access terminal initiates communication with a radio area network through the embedded access point.

Implementations may include one or more of the following features.

Performing the determination includes comparing a portion of the parameter to a corresponding portion of one or more entries in the list. The determination is positive if the comparing produces a match between the portion of the parameter and the corresponding portion of at least one entry in the list. The determination is not positive if the comparing produces a match between the portion of the parameter and the corresponding portion of at least one entry in the list. The list includes a first list and a second list, and performing the determination includes comparing the parameter to one or more entries in the first list and comparing the parameter to one or more entries in the second list the determination being positive only if the comparison to the first list produces a match and the comparison to the second list does not produce a match. Comparing the parameter to the first list includes comparing a first portion of the parameter to a corresponding portion of each of the one or more entries in the first list. Comparing the parameter to the second list includes comparing a second portion of the parameter to a corresponding second portion of each of the one or more entries in the second list. The first portion of the parameter and the second portion of the parameter at least partially overlap.

The first list defines a set of access points, and the second list defines a subset of the set of access points. The set of access points is open. The subset is open. Comparing the portions includes identifying one or more first fields of data in an entry of the list as having data representing values, identifying one or more second fields of data in an entry in the list as having data representing wildcards, and comparing the values represented by the data in the first fields to values represented by data in corresponding fields of the parameter. The parameter includes one or more or a combination of a Cell ID, a Sector ID, or a PN Offset. Each entry in the list includes data fields identifying one or more or a combination of a carrier frequency, a band class, a channel number, a code space identifier, a Cell ID, a Sector ID, a PN Offset, and a scrambling code. One or more of the entries in the list includes a value that is matched to more than one unique potential value of the parameter. The list includes a preferred user zone list. The list includes a hierarchical cell structure list. The list is received from a server associated with the radio area network. An entry is added to the list in response to input by a user of the access terminal. An entry is added to the list in response to a message received from an element of the radio area network. The determining is carried out in response to receiving an indication that at least one access point identified in the list is nearby. Receiving the indication includes receiving input from a user of the access terminal. Receiving the indication includes receiving an identification of the geographic location of the access terminal. Receiving the indication includes matching an entry in the list to an entry in a list of access points provided by another access point with which the access terminal is in communication.

In general, in one aspect, an access terminal is enabled to identify embedded access points through which the access terminal should be granted access to a radio area network. A list is received identifying a set of access points. A first set of identifiers is determined that identify a superset of the set of access points. A second set of identifiers is determined that identify the subtraction of the set of access points from the first set of identifiers. The first set and the second set of identifiers are stored in a memory of the access terminal.

Implementations may include one or more of the following features. The identifiers of the first set each include a value of a first portion of a parameter to be encoded in a signal to be transmitted by the access points. The identifiers of the second set each include a value of a second portion of the parameter. The first set of identifiers include values of the portion of the parameter that identify access points associated with a first entity. The first set of identifiers include values of the first portion of the parameter that identify access points associated with a first entity and the second set of identifiers include values of the second portion identified with a second entity.

Advantages include allowing access terminals to determine whether they will be able to access the network through a given access point prior to attempting to communicate with the access point, saving bandwidth and power, without requiring changes to the design or infrastructure of the macro network. Other features and advantages of the invention will be apparent from the description and the claims.

DESCRIPTION

FIG. 2 shows a wireless network with an embedded cell.

Figure 1:
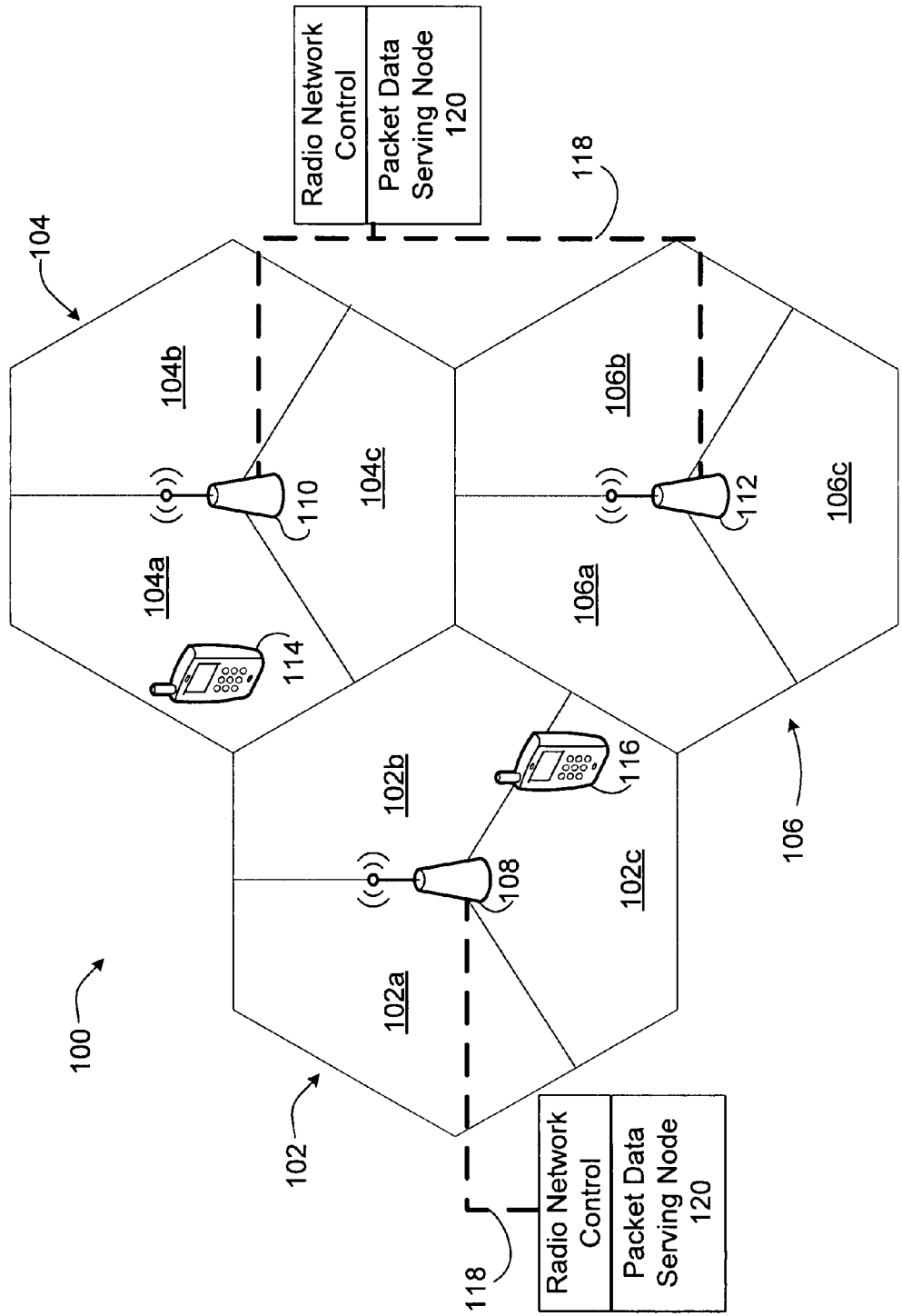
FIG. 1 shows a wireless network.

In some examples, as shown in FIG. 2, a radio network access point 202 may be deployed in a user's home 200 in the same manner as a WiFi® access point. Such a radio network access point is referred to as a private access point. The private access point 202 may use any available high-speed internet connection, such as DSL or cable modem 204, as the backhaul with the RNC/PDSN functionality implemented in the private access point 202. Such a private access point may be installed anywhere that it is advantageous to do so, for example, in an office, a public space, or a restaurant.

In some examples, a set of private access points 212*a*, 212*b* with corresponding modems 214*a*, 214*b* are installed in multiple locations 210*a*, 210*b* within a single facility or community 209. The are referred to as community access points or hotspots, and may service a defined set of users of access terminals 216, such as students and faculty at a university, employees in a business complex, and the like.

In some examples, a set of private access points 222*a*, 222*b* with corresponding modems 224*a*, 224*b* are installed in multiple locations 220*a*, 220*b*, 220*c* that are distributed geographically but associated in some manner, such as branches of a restaurant or retail chain or distributed offices of a business, forming a network 218. These are referred to as network access points or hotspots, and may service various sets of users of access terminals 226. For example, a restaurant chain may provide hotspots in each of its outlets so that customers and employees are assured of a cellular signal while at the restaurant. The restaurant may choose to only service its own employees, or only customers who subscribe to a particular service plan.

The area served by an access point in each of these models is referred to as a femto cell or pico cell, and more generally as an embedded cell. Typically, femto cell refers to a personal access point, such as the access point 202 in the home 200, while pico cell refers to an access point serving a larger, but still constrained, population, such as access points 212*a*, 212*b*, 222*a*, 222*b*, and 222*c*. In some examples, an embedded cell access point may be integrated into a cable modem or other network hardware, such as a router or WiFi access point.

When an authorized access terminal 206, 216, 226 is within range of an embedded access point 202, 212*i*, or 222*i* (where i is one of a, b, c), it uses the embedded access point, rather than a regular cellular radio network access point such as access point 108, to place or receive voice calls and data connections, even if it is otherwise within the cell 102 for that access point 108. We sometimes refer to the standard access point 108 as a macro access point or macro BTS to distinguish it from an embedded access point, as it provides direct access to the wider RAN 100 (FIG. 1).

Access terminals are typically designed to work in meticulously engineered wide-area cellular networks (macro networks), and existing wide-area mobile cellular communications standards are designed for such deployment scenarios. Adding embedded cells to macro networks based on existing standards introduces new complexities in the ways that access terminals determine which macro or embedded access point to use. To reduce the impact of embedded cells on existing infrastructure, without requiring changes to existing standards, changes can be made to access terminals so that they can interoperate with macro networks and embedded cells without requiring changes to the macro networks.

Pico cells have slightly different deployment considerations than femto cells. For example, community and network embedded cells serve a larger group of potential users, and are typically centrally managed, while personal embedded cells serve a small group of users and are typically managed by one of those users. Modifications to access terminals to make access control a part of their system selection process allow a single technique to accommodate both pico cells and femto cells.

To provide access terminals the ability to determine whether they will be allowed to access the RAN 100 through an embedded access point before initiating a connection to that embedded access point, the access terminals are loaded with one or both of two lists, a "white list" and a "black list." The white list tells the access terminal which embedded cells to look for, and the black list, in some examples a subset of the white list, tells the access terminal which embedded cells to ignore. If both lists are used, the set of embedded cells that the access terminal can access is the result of set subtraction of the set defined by the black list from set defined by the white list.

In some examples, the white list and black list contain identifications of embedded cells that the access terminal is allowed to access. It may also indicate which of these the access terminal is preferred to access. Each entry in the white list includes information usable to detect, identify, and communicate with the access point. Examples include a carrier frequency, such as a band class and channel number, coding or code space information, such as PN-offsets and scrambling codes, and an identifier. Entries may also include coverage area information, such as geographic location and cell radius, useful in determining that an embedded cell should be nearby, before its signals are directly detected.

The identifier is selected-based on a number of considerations. To avoid changing the existing infrastructure, identification information that is already broadcast by access points can be used as the identifier, such as cell ID, sector ID, PN offset, or some combination of such parameters. Good candidates for identification information are parameters that are available on a common channel in a form that requires little processing cycles and time to obtain and decode, for example, parameters that are repeated very frequently by the access point broadcasting them. In some examples, the identifier is at least quasi-unique, that is, it is unique within a suitable geographic area.

Figure 3A:
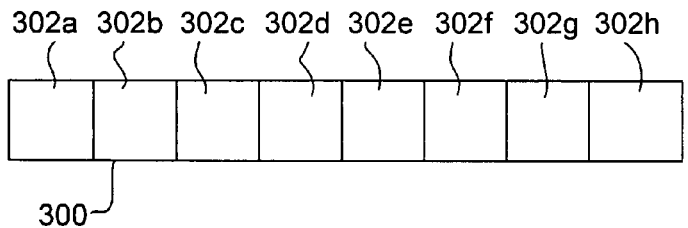
FIGS. 3A-3C show schematic representations of data structures.
Figure 3B:
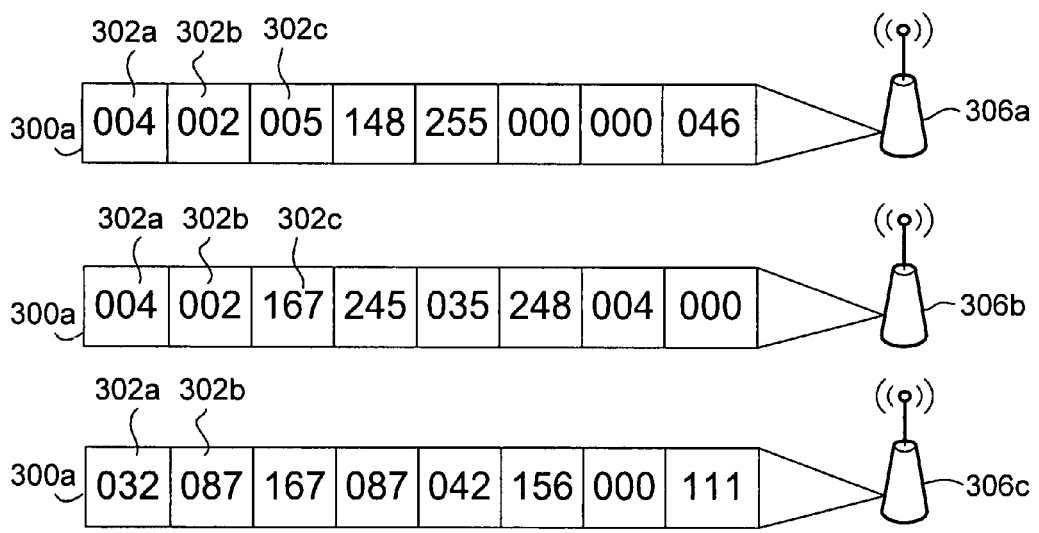

In some examples, the identifier is wild-carded in the white list or black list so that a single identifier can point out multiple embedded cells that the access terminal may or may not use. We refer to the set of embedded cells identified by such an identifier as "open." For example, as shown in FIG. 3A, a parameter 300 used as the identifier has eight bytes 302a-302h. Within a given network, as shown in FIG. 3B, all the embedded access points for a certain community include the same value "004, 002" in the first two bytes 302a and 302b in the parameter 304. Two access points 306a, 306b transmit parameters 300a, 300b, respectively, both with "004, 002" in their leading bytes 302a and 302b. A third access point 306c has different value "032, 087" in its leading bytes 302a and 302b in its parameter 300c.

Figure 3C:
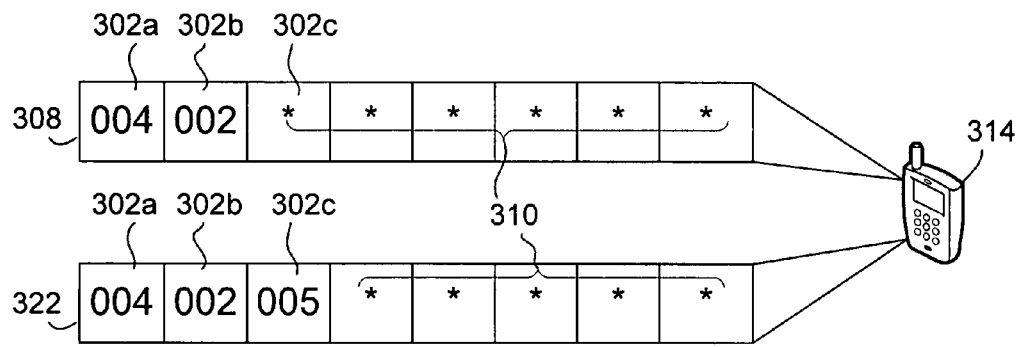

As shown in FIG. 3C, a single white list identifier 308 with "004, 002" in the two first bytes 302a and 302b and wildcards 310 for the remaining bytes 302c-302h tells an access terminal 314 that it may access any embedded cell with "004, 002" in the first two bytes 302a and 302b leading the identifying parameter 300. Therefore, the access terminal 314 may access the embedded access points 306a and 306b, but not the access point 306c (barring any additional identifiers in its white list that would point out the access point 306c).

Within the white list of embedded cells that an access terminal can access, there may be come embedded cells that it should not access. For example, if wildcards are used such that the white list identifies any access point operated by a given company as allowed, there may be some access points in that set that are restricted to employees, and others that are open to customers. The black list identifies the access points that are restricted to employees, so that the access terminal will only attempt to access those access points that are open to customers. In the example of FIG. 3, the third byte 302c of the parameter 300 indicates which subsets of users are allowed to access a given access point, within those access points identified as belonging to the community. The first access point 306a has a value "005" at byte 302c, while the second access point 306b has a value "167." The blacklist includes an identifier 322 with "004, 002" in the first two bytes 302a and 302b and "005" in the third byte 302c. This tells the access terminal 314 that even though the white list identifier 308 covers both of the access terminals 306a and 306b, the access terminal cannot use the access terminal 306a. Such a combination of wildcards in white lists and black lists allows a concise set of identifiers to define complex sets of embedded cells that an access terminal may access. In addition to wild cards, ranges of values and bitmasks may be used to identify allowed or disallowed cells.

Figure 4:
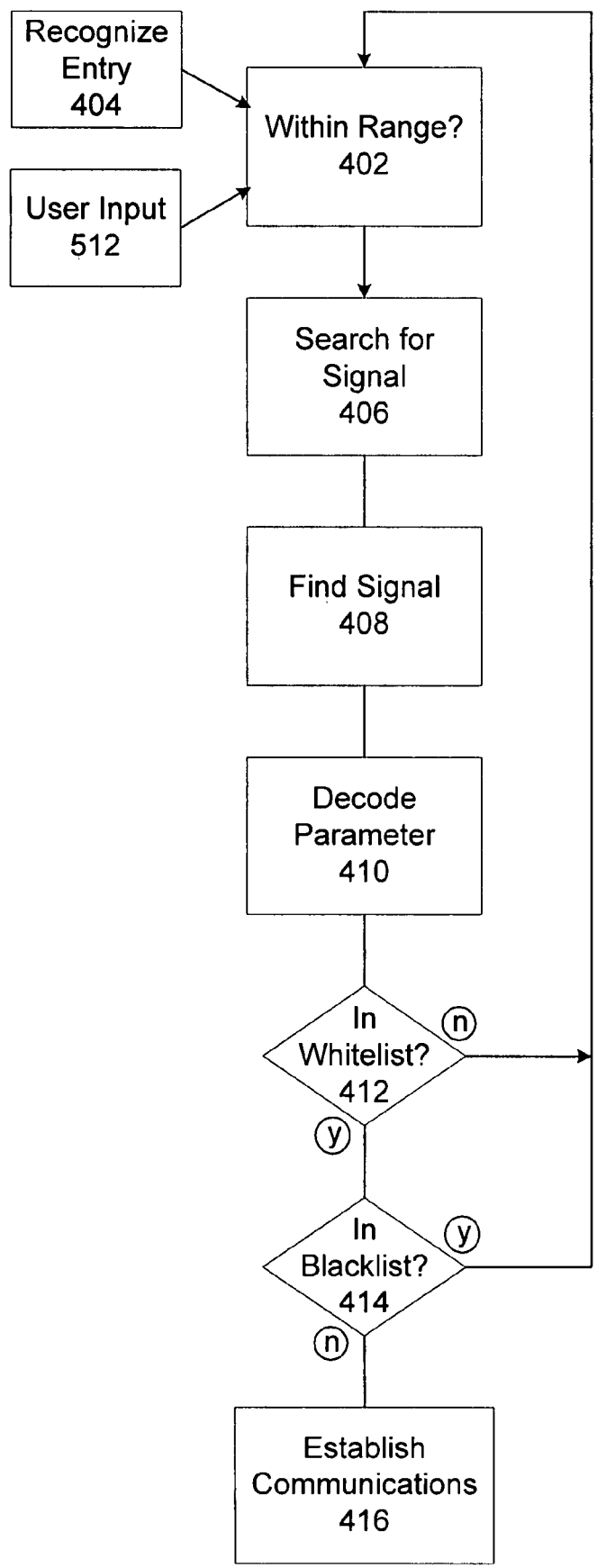
FIG. 4 shows a flow chart.
Figure 5:
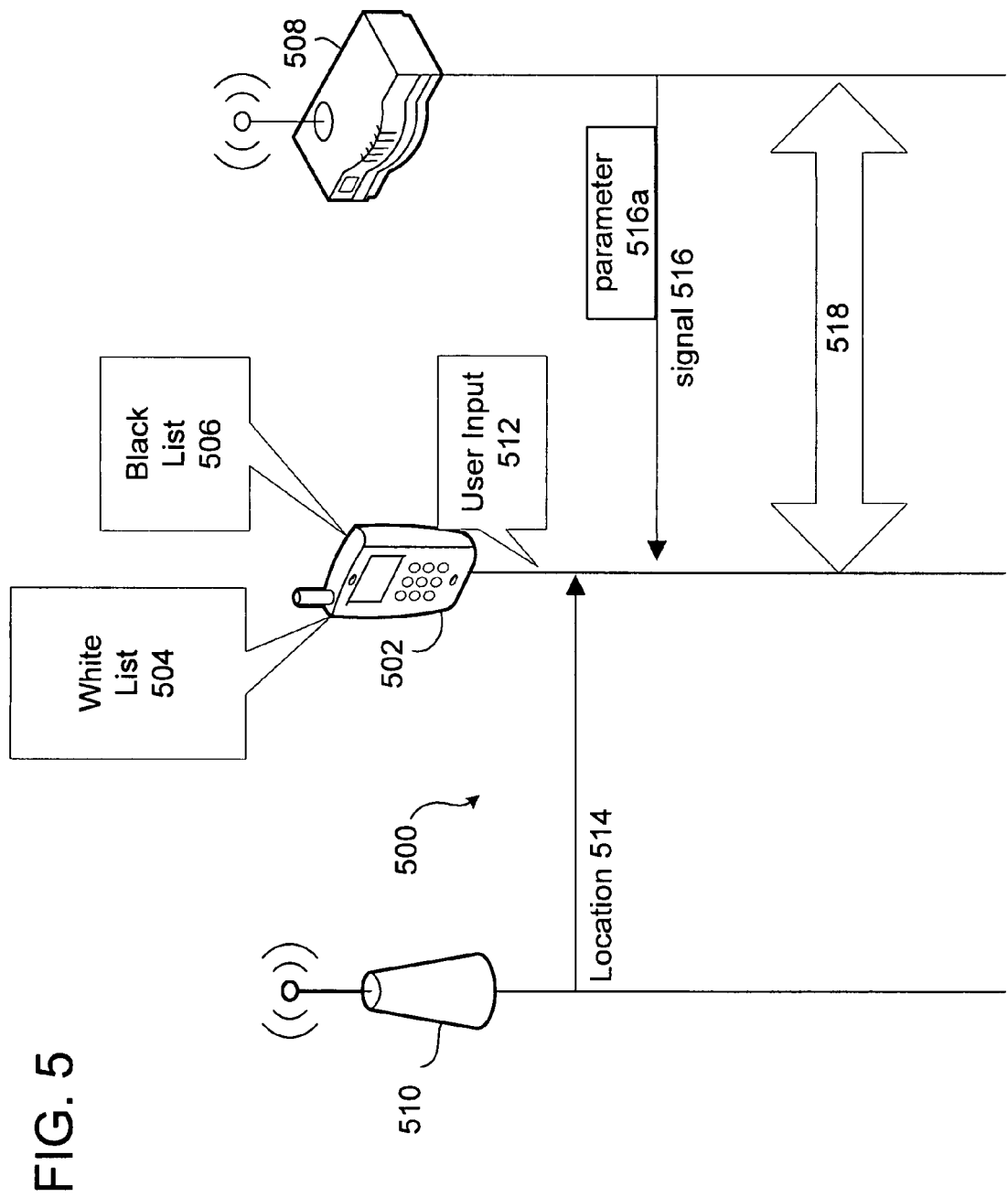
FIG. 5 shows a messaging sequence.

In some examples, as shown in FIGS. 4 and 5, an access terminal 502 uses its white list 504 and black list 506 to access an embedded cell 508 using a process 400, (FIG. 4), to carry out a pattern of messaging 500, (FIG. 5). The process 400 begins when the access terminal 502 is given 402 a reason to believe that it may be within the coverage range of a while-listed embedded cell (not necessarily specifically the cell 508). This may be a result of user input 512 or based on geographic information 514 received from the macro network 510. For example, the access terminal 502 may recognize 404 that there is an entry in the white list 504 with coverage information 514a matching the geographic information 514. In some examples, other information received from the macro network gives the access terminal a reason to search for an embedded cell. If, for example, a neighbor list transmitted by an element of the macro network 510 includes an identifier or other signal information for an embedded cell that is also included in the access terminal's white list, the access terminal will look for that embedded cell.

The access terminal 502 next searches 406 for a signal that is on a carrier frequency and coding base included in one of the entries in the white list 504. Finding 408 a signal 516 having a matching carrier frequency and code space, the access terminal 502 decodes 410 the parameter 516a being used as the identifier and confirms 412 and 414 that it matches an entry on the white list 504 and is not on the black list 506. If the confirmations are positive, the access terminal 502 establishes 416 communications 518 with the embedded cell 508.

In some examples, only one of the white list 504 or black list 506 is used. For example, an access terminal may be configured to assume that all embedded cells on a given frequency and code base are allowed, and only check the black list 506 to see if the specific cell it found is excluded. Likewise, an access terminal may be configured to only check the white list 504, in a case where the white list includes all specific cells that are allowed, and does not include any cells that not allowed. A neighbor list that prompted the access terminal to search for the embedded cell may not include the identifier, in which case the access terminal will look for the embedded cell based on the frequency and code base (or other information from the neighbor list), but will still have to decode 410 and confirm 412 and/or 414 the identifier.

In some examples, the white list is implemented in the form of a preferred user zone list (PUZL) for CDMA systems. Preferred user zone lists are explained in U.S. patent application Ser. No. 11/640,503, titled Configuring Preferred User Zone Lists for Private Access Points for Wireless Networking, filed Dec. 15, 2006, assigned to the assignee of this application, and incorporated here by reference. In some examples, the white list is implemented in the form a hierarchical cell structure (HCS) for UMTS systems. These existing mechanisms may be expanded, or new mechanisms added, to accommodate white lists and black lists of embedded cells. In some examples, the lists are unique for each access terminal, while in other examples a set of access terminals, such as all the access terminals issued by a company to its employees, may have a common white list, black list, or both.

In some examples, the white lists and black lists are manually entered into access terminals by their users, either directly or through some remote configuration process, such as a web site operated by a cellular carrier. In some examples, the lists are delivered to access terminals over the air using over-the-air provisioning (OTAP). The OTAP process may be initiated by the access terminal (in response to user input or autonomously) or by a server in the network. In some examples, an operator of an embedded access point may remove a given access terminal from a list of access terminals permitted to use that access point. This causes the service management platform to construct a new white list and black list for that access terminal and send it to the access terminal using an OTAP server.

Using access lists programmed into access terminals allows the access terminals to determine whether they have permission to use a given embedded access point before spending resources attempting to connect to it and authenticate. This provides advantages such as improved battery life for the access terminal and more reliable system selection behaviors on the access terminal without requiring changes to the macro network or to how the macro network is deployed.

Although the techniques described above employ the 1xRTT, EV-DO, UMTS, and HSDPA air interface standards, the techniques are also applicable to other air interface technologies in which access terminals determine which access points to communicate with.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims. The following are examples for illustration only and not to limit the alternatives in any way. The techniques described herein can be performed in a different order and still achieve desirable results.

What is claimed is:

1. A method performed by an access terminal, comprising:
    receiving a signal from an access point to a radio area network, the signal comprising a first identifier;
    determining whether the first identifier corresponds to a second identifier in a white list in memory of the access terminal, the white list identifying one or more access points that the access terminal is authorized to use, the second identifier comprising wildcard data, the first identifier being determined to correspond to the second identifier if data in the first identifier matches data at corresponding positions in the second identifier excluding the wildcard data;
    determining whether the first identifier corresponds to a third identifier in a black list in memory of the access terminal, the black list identifying one or more access points that the access terminal is not authorized to use, the first identifier being determined to correspond to the third identifier if data in the first identifier matches data at corresponding positions in the third identifier; and
    determining whether to communicate with the radio area network through the access point based on whether the first identifier corresponds to the second identifier and based on whether the first identifier corresponds to the third identifier.

2. The method of claim 1, wherein determining whether the first identifier corresponds to the second identifier comprises comparing a portion of the first identifier to a corresponding portion of the second identifier that does not include the wildcard data; and
    wherein determining whether the first identifier corresponds to the third identifier comprises comparing a portion of the first identifier to a corresponding portion of the third identifier, the third identifier having less wildcard data than the second identifier.

3. The method of claim 2, wherein each entry in the white list includes data fields identifying one or more or a combination of a carrier frequency, a band class, a channel number, a code space identifier, a Cell ID, a Sector ID, a PN Offset, and a scrambling code.

4. The method of claim 1, wherein the second identifier and the third identifier have identical data up to a position where the second identifier includes the wildcard data and, thereafter, the third identifier has at least some data that is different from data at corresponding positions in the second identifier.

5. The method of claim 4, wherein at a position where the second identifier includes the wildcard data, the third identifier includes non-wildcard data and, thereafter, the third identifier includes at least some wildcard data.

6. The method of claim 1, wherein it is determined to communicate with the radio area network if the first identifier corresponds to the second identifier and the first identifier does not correspond to the third identifier, and it is determined not to communicate with the radio area network if the first identifier corresponds to the third identifier.

7. The method of claim 1, wherein the white list corresponds to a first set of access points, and the black list corresponds to a subset of the first set of access points.

8. The method of claim 7, wherein the first set of access points is open because of wildcard data in identifiers for at least some access points in the white list.

9. The method of claim 8, wherein the subset is open because of wildcard data in identifiers for at least some access points in the black list.

10. The method of claim 1, wherein the first identifier comprises one or more or a combination of a Cell ID, a Sector ID, or a PN Offset.

11. The method of claim 1, wherein one or more entries in the white list includes an entry value that corresponds to a plurality of unique values for identifiers.

12. The method of claim 1, wherein the white list comprises a preferred user zone list.

13. The method of claim 1, wherein the white list comprises a hierarchical cell structure list.

14. The method of claim 1, further comprising:
receiving the white list from a server associated with the radio area network.

15. The method of claim 1, further comprising:
adding an entry to the white list in response to input by a user of the access terminal.

16. The method of claim 1, further comprising:
adding an entry to the white list in response to a message received from an element of the radio area network.

17. An apparatus comprising:
an access terminal for communicating with a radio area network, the access terminal comprising one or more processing devices programmed to perform operations rising:
receiving a signal from an access point, the signal comprising a first identifier;
determining whether the first identifier corresponds to a second identifier in a white list in memory of the access terminal, the white list identifying one or more access points that the access terminal is authorized to use the second identifier comprising wildcard data, the first identifier being determined to correspond to the second identifier if data in the first identifier matches data at corresponding positions in the second identifier excluding the wildcard data;
determining whether the first identifier corresponds to a third identifier in a black list in memory of the access terminal, the black list identifying one or more access points that the access terminal is not authorized to use, the first identifier being determined to correspond to the third identifier if data in the first identifier matches data at corresponding positions in the third identifier; and
determining whether to communicate with the radio area network through the access point based on whether the first identifier corresponds to the second identifier and based on whether the first identifier corresponds to the third identifier.

18. The apparatus of claim 17, wherein determining whether the first identifier corresponds to the second identifier comprises comparing a portion of the first identifier to a corresponding portion of the second identifier that does not include the wildcard data; and
wherein determining whether the first identifier corresponds to the third identifier comprises comparing a portion of the first identifier to a corresponding portion of the third identifier, the third identifier having less wildcard data than the second identifier.

19. The apparatus of claim 18, wherein each entry in the white list includes data fields identifying one or more or a combination of a carrier frequency, a band class, a channel number, a code space identifier, a Cell ID, a Sector ID, a PN Offset, and a scrambling code.

20. The apparatus of claim 17, wherein the second identifier and the third identifier have identical data up to a position where the second identifier includes the wildcard data and, thereafter, the third identifier has at least some data that is different from data at corresponding positions in the second identifier.

21. The apparatus of claim 20, wherein at a position where the second identifier includes the wildcard data, the third identifier includes non-wildcard data and, thereafter, the third identifier includes at least some wildcard data.

22. The apparatus of claim 17, wherein it is determined to communicate with the radio area network if the first identifier corresponds to the second identifier and the first identifier does not correspond to the third identifier, and it is determined not to communicate with the radio area network if the first identifier corresponds to the third identifier.

23. The apparatus of claim 17, wherein the white list corresponds to a first set of access points, and the black list corresponds to a subset of the first set of access points.

24. The apparatus of claim 23, wherein the first set of access points is open because of wildcard data in identifiers for at least some access points in the white list.

25. The apparatus of claim 24, wherein the subset is open because of wildcard data in identifiers for at least some access points in the black list.

26. The apparatus of claim 17, wherein the first identifier comprises one or more or a combination of a Cell ID, a Sector ID, or a PN Offset.

27. The apparatus of claim 17, wherein one or more entries in the white list includes an entry value that corresponds to a plurality of unique values for identifiers.

28. The apparatus of claim 17, wherein the white list comprises a preferred user zone list.

29. The apparatus of claim 17, wherein the white list comprises a hierarchical cell structure list.

30. The apparatus of claim 17, wherein the operations further comprise:
receiving the white list from a server associated with the radio area network.

31. The apparatus of claim 17, wherein the operations further comprise:

adding an entry to the white list in response to input by a user of the access terminal.

32. One or more non-transitory machine-readable storage media storing instructions that are executable by one or more processing devices to perform operations comprising:
receiving a signal from an access point, the signal comprising a first identifier;
determining whether the first identifier corresponds to a second identifier in a white list in memory of an access terminal, the white list identifying one or more access points that the access terminal is authorized to use, the second identifier comprising wildcard data, the first identifier being determined to correspond to the second identifier if data in the first identifier matches data at corresponding positions in the second identifier excluding the wildcard data;
determining whether the first identifier corresponds to a third identifier in a black list in memory of the access terminal, the black list identifying one or more access points that the access terminal is not authorized to use, the first identifier being determined to correspond to the third identifier if data in the first identifier matches data at corresponding positions in the third identifier; and
determining whether to communicate with a radio area network through the access point based on whether the first identifier corresponds to the second identifier and based on whether the first identifier corresponds to the third identifier.

33. The apparatus of claim 25, wherein the operations further comprise:
adding an entry to the white list in response to a message received from an element of the radio area network.

34. The one or more non-transitory machine-readable storage media of claim 32, wherein determining whether the first identifier corresponds to the second identifier comprises comparing a portion of the first identifier to a corresponding portion of the second identifier that does not include the wildcard data; and
wherein determining whether the first identifier corresponds to the third identifier comprises comparing a portion of the first identifier to a corresponding portion of the third identifier, the third identifier having less wildcard data than the second identifier.

35. The one or more non-transitory machine-readable storage media of claim 34, wherein each entry in the white list includes data fields identifying one or more or a combination of a carrier frequency, a band class, a channel number, a code space identifier, a Cell ID, a Sector ID, a PN Offset, and a scrambling code.

36. The one or more non-transitory machine-readable storage media of claim 32, wherein the second identifier and the third identifier have identical data up to a position where the second identifier includes the wildcard data and, thereafter, the third identifier has at least some data that is different from data at corresponding positions in the second identifier.

37. The one or more non-transitory machine-readable storage media of claim 36, wherein at a position where the second identifier includes the wildcard data, the third identifier includes non-wildcard data and, thereafter, the third identifier includes at least some wildcard data.

38. The one or more non-transitory machine-readable storage media of claim 32, wherein it is determined to communicate with the radio area network if the first identifier corresponds to the second identifier and the first identifier does not correspond to the third identifier, and it is determined not to communicate with the radio area network if the first identifier corresponds to the third identifier.

39. The one or more non-transitory machine-readable storage media of claim 32, wherein the white list corresponds to a first set of access points, and the black list corresponds to a subset of the first set of access points.

40. The one or more non-transitory machine-readable storage media of claim 39, wherein the first set of access points is open because of wildcard data in identifiers for at least some access points in the white list.

41. The one or more non-transitory machine-readable storage media of claim 40, wherein the subset is open because of wildcard data in identifiers for at least some access points in the black list.

42. The one or more non-transitory machine-readable storage media of claim 32, wherein the first identifier comprises one or more or a combination of a Cell ID, a Sector ID, or a PN Offset.

43. The one or more non-transitory machine-readable storage media of claim 32, wherein one or more entries in the white list includes an entry value that corresponds to a plurality of unique values for identifiers.

44. The one or more non-transitory machine-readable storage media of claim 32, wherein the white list comprises a preferred user zone list.

45. The one or more non-transitory machine-readable storage media of claim 32, wherein the white list comprises a hierarchical cell structure list.

46. The one or more non-transitory machine-readable storage media of claim 32, wherein the operations further comprise:
receiving the white list from a server associated with the radio area network.

47. The one or more non-transitory machine-readable storage media of claim 32, wherein the operations further comprise:
adding an entry to the white list in response to input by a user of the access terminal.

48. The one or more non-transitory machine-readable storage media of claim 32, wherein the operations further comprise:
adding an entry to the white list in response to a message received from an element of the radio area network.

49. A method performed by one or more servers, comprising:
obtaining information for one or more access points through which an access terminal is granted or denied access to a radio area network;
generating, based on the information, a white list identifying one or more access points that the access terminal is authorized to use, the white list comprising first identifiers, at least one of the first identifiers comprising wildcard data, wherein a first identifier is determined to correspond to an access point identifier if data in the first identifier matches data at corresponding positions in the access point identifier excluding the wildcard data
generating, based on the information, a black list identifying one or more access points that the access terminal is not authorized to use, the black list comprising second identifiers, wherein a second identifier is determined to correspond to the access point identifier if data in the second identifier matches data at corresponding positions in the access point identifier; and
sending the white list and the black list to the access terminal.

50. The method of claim 49, further comprising:
receiving an identification of an additional access point through which the specified access terminal is granted access to the radio area network;

updating the white list to produce an updated white list that includes the additional access pint; and sending the updated white list to the access terminal.

51. The method of claim 49, wherein sending comprises using an over-the-air configuration protocol.

52. An apparatus comprising:
one or more processing devices programmed to perform operations comprising:
obtaining information for one or more access points through which an access terminal is granted or denied access to a radio area network;
generating, based on the information, a white list identifying one or more access points that the access terminal is authorized to use, the white list comprising first identifiers, at least one of the first identifiers comprising wildcard data, wherein a first identifier is determined to correspond to an access point identifier if data in the first identifier matches data at corresponding positions in the access point identifier excluding the wildcard data
generating, based on the information, a black list identifying one or more access points that the access terminal is not authorized to use, the black list comprising second identifiers, wherein a second identifier is determined to correspond to the access point identifier if data in the second identifier matches data at corresponding positions in the access point identifier; and
sending the white list and the black list to the access terminal.

53. The apparatus of claim 52, wherein the one or more processing devices are programmed to perform operations comprising:
receiving an identification of an additional access point through which the access terminal is granted access to the radio area network;
updating the white list to produce an updated white list that includes the additional access pint; and
sending the updated white list to the access terminal.

54. The apparatus of claim 52, wherein the one or more processing devices are also programmed to send the white list and the black list to a plurality of access terminals.

55. The apparatus of claim 52, wherein sending comprises using an over-the-air configuration protocol.

56. One or more non-transitory machine-readable media storing instructions that are executable by one or more processing devices to perform operations comprising:
obtaining information for one or more access points through which an access terminal is granted or denied access to a radio area network;
generating, based on the information, a white list identifying one or more access points that the access terminal is authorized to use, the black list comprising first identifiers, at least one of the first identifiers comprising wildcard data, wherein a first identifier is determined to correspond to an access point identifier if data in the first identifier matches data at corresponding positions in the access point identifier excluding the wildcard data
generating, based on the information, a black list identifying one or more access points that the access terminal is not authorized to use, the white list comprising second identifiers, wherein a second identifier is determined to correspond to the access point identifier if data in the second identifier matches data at corresponding positions in the access point identifier; and
sending the white list and the black list to the access terminal.

57. The one or more non-transitory machine-readable media of claim 56, wherein the operations comprise:
receiving an identification of an additional access point through which the access terminal is granted access to the radio area network;
updating the white list to produce an updated white list that includes the additional access pint; and
sending the updated white list to the access terminal.

58. The one or more non-transitory machine-readable media of claim 56, wherein sending comprises using an over-the-air configuration protocol.

* * * * *

UNITED STATES PATENT AND TRADEMARK OFFICE
CERTIFICATE OF CORRECTION

PATENT NO. : 8,594,663 B2  
APPLICATION NO. : 11/903742  
DATED : November 26, 2013  
INVENTOR(S) : Ch'ng et al.

Page 1 of 1

It is certified that error appears in the above-identified patent and that said Letters Patent is hereby corrected as shown below:

In the Claims

Column 9, Line 53, Claim 17, delete "rising:" and insert -- comprising: --, therefor.

Column 11, Line 29, Claim 33, delete "claim 25," and insert -- claim 32, --, therefor.

Column 11, Line 29, Claim 33, delete "apparatus" and insert -- one or more non-transitory machine-readable storage media --, therefor.

Column 12, Line 54, Claim 49, after "data" insert -- ; --.

Column 12, Line 66, Claim 50, after "which the" delete "specified".

Column 13, Line 2, Claim 50, delete "pint" and insert -- point --, therefor.

Column 13, Line 21, Claim 52, after "data" insert -- ; --.

Column 13, Line 38, Claim 53, delete "pint;" and insert -- point; --, therefor.

Column 14, Line 14, Claim 56, delete "black" and insert -- white --, therefor.

Column 14, Line 18, Claim 56, after "data" insert -- ; --.

Column 14, Line 21, Claim 56, delete "white" and insert -- black --, therefor.

Column 14, Line 34, Claim 57, delete "pint;" and insert -- point; --, therefor.

Signed and Sealed this  
Fifteenth Day of July, 2014

Michelle K. Lee  
*Deputy Director of the United States Patent and Trademark Office*